April 22, 1924.
O. C. ZIMMERMAN
1,491,221
JIG FOR REAMING CONNECTING ROD BEARINGS
Filed June 8, 1920
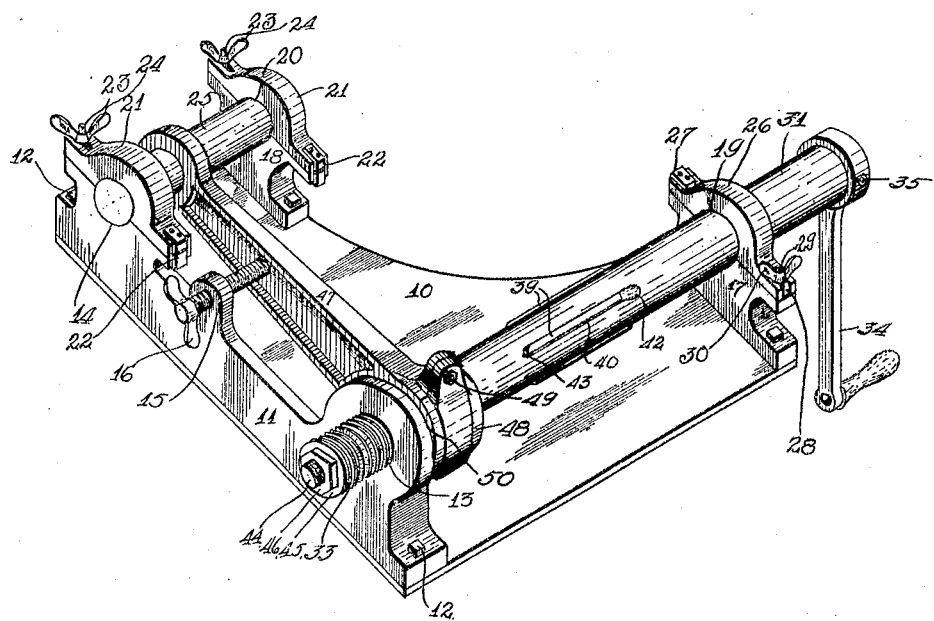
Inventor
O. C. Zimmerman
by Orwig & Bair Atty's Patented Apr. 22, 1924.

1,491,221

UNITED STATES PATENT OFFICE.

ORRIN C. ZIMMERMAN, OF COFFEE CREEK, MONTANA.

JIG FOR REAMING CONNECTING-ROD BEARINGS.

Application filed June 8, 1920. Serial No. 387,459.

*To all whom it may concern:*

Be it known that I, ORRIN C. ZIMMERMAN, a citizen of the United States, and a resident of Coffee Creek, in the county of Fergus and State of Montana, have invented a certain new and useful Jig for Reaming Connecting-Rod Bearings, of which the following is a specification.

The object of my invention is to provide a jig for reaming connecting rod bearings of simple, durable and inexpensive construction.

More specifically it is my object to provide such a jig adapted to support a connecting rod and provided with mechanism for adjusting the connecting rod to various positions and to support a reamer in operative position with the bearings of said connecting rod in such a manner that the bearings of the connecting rod will be reamed parallel with the wrist pin of the connecting rod, the device being so arranged that the connecting rod and reamer may be easily and quickly attached.

My invention consists in the construction, arrangement and combination of the various parts of the device, whereby the objects contemplated are attained, as hereinafter more fully set forth, pointed out in my claim, and illustrated in the accompanying drawings, in which:

Figure 1 is a perspective view of my device with the connecting rod and the reamer for operating on the same in operative position.

In the accompanying drawings, I have used the reference numeral 10 to indicate generally a base, which is substantially L-shaped. Adjacent to one edge of the base 10 is the bracket 11, which is secured to the base by means of the bolts 12. The bracket 11 is provided at its forward and rear edges with the bearings 13 and 14.

Substantially in the center of the bracket 11, I provide an upwardly, extending lug 15, which is provided with the thumb screw 16, the purpose of which will be more fully set forth.

On the opposite side of the base 10, I provide the bracket members 17 and 18, which are provided with the bearings 19 and 20. The bearing 19 is alined with the bearing 13, while the bearing 20 is alined with the bearing 14. The alinement of one set of bearings is parallel with the alinement of the opposite set of bearings.

The bearings 14 and 20 are provided with the bearing caps 21, which are hinged at 22. On the opposite side of the hinged portion 22 are the bolts 23 and the wing nuts 24, by which the bearing caps 21 are held in position.

The bearings 14 and 20 are designed to receive the wrist pin 25 of a connecting rod 47. The bearing 19 is provided with a bearing cap 26, which is also hinged to the bracket or support 17 by means of the hinge 27.

The opposite side of the bracket or bearing cap 26 is provided with a slot 28, in which is received the bolt 29. The wing nut 30, which is secured to the bolt 29 is adapted to rest against the bearing cap 26 and hold it in position. The bearing 13 is internally screw-threaded.

The bearings 13 and 19 are designed to receive a reamer 31 having cutting blades 39 and one end provided with a screw threaded portion 33 designed to enter the screw threaded portion of the bearing 13. The opposite end of the reamer is provided with a crank 34, by which the same may be rotated in the said bearings, and moved longitudinally therewith by the screw threaded portion 33.

I have illustrated the connecting rod 47 which carries its wrist pin 25. In placing the connecting rod 47 in position, I swing the caps 21 of the bearings 14 and 20 into an open position, after which I place the wrist pin 25 in position in said bearings and clamp the same therein by moving the caps 21 to their closed position, then applying the bolts 23 and the thumb nuts 24. The connecting rod is then slid toward the lug 15 until one face of the crank bearing member 48 is adjacent to the face 50 which is formed on the inner face of the bracket 11 adjacent to the bearing 13 with the opening of the bearing 48 in alinement with the opening of the bearing 13 to receive the reamer 31.

By this method of mounting the connecting rod, I have provided means whereby the opening of the bearing 48 will be in alinement with the openings of the bearings 13 and 19, and also so arranged that when the reamer is passed through the bearing 48 the opening of said bearing will be parallel with the wrist pin 25 so that the said bearing 48 will accurately fit the crank when in position in the engine.

When the connecting rod 47 has been placed in position, the thumb screw 47 is moved to position until it engages the outer face of the connecting rod, the said thumb screw and the face 50 forming rigid bearings against which the connecting rod may rest, while the reamer is in operation. The thumb screw 16 may also be used for any slight adjustment for alining the bearings if so desired.

The bracket 11 adjacent to the bearing 13 is provided with a slightly inwardly extending face 50 against which the bearing cap of the connecting rod will rest.

After the connecting rod 47 has been placed in position, the cap 26 is moved to an open position. The crank end of the cylindrical portion of the reamer 31 is then placed in the bearing 19, after which the cap 26 is moved to a closed position and the same locked by means of the thumb nut 30. The said cap 26 fits just tight enough so that the reamer 31 is free to move longitudinally through the said bearing. The screw threaded end of the reamer is then slid through the opening of the bearing 48, the screw threaded portion of which is designed to engage the screw threaded portion of said bearing. The crank 34 is then grasped and the reamer is rotated which will cause the same to be moved longitudinally through the said bearings 13 and 19 until the blades 39 engage the bearing 48. Continuation of the rotation of said crank will cause the said blades to enter said bearings and the same to be reamed out. The opening of said bearing is then parallel with the wrist pin 25.

One of the advantages of my device is that I am able to sufficiently adjust the connecting rod until the bearings of said connecting rod properly aline with the bearings of the reamer and remount the bearings without the necessity of a great amount of delicate adjustments or tools, and which may be easily and quickly accomplished.

It will therefore be seen that I have provided a device of simple, durable and inexpensive construction which may be easily and quickly operated, and at the same time produce a bearing which is accurate and in alinement with the wrist pin.

I claim as my invention:

A jig for reaming connecting rods comprising a base, a pair of alined wrist pin bearings, a hinged cap for each of said bearings, a thumb nut for locking each of said bearings in position, a pair of alined reamer supporting bearings, the alinement of which is parallel to the alinement of said wrist pin bearings, one of said reamer supporting bearings being provided with a hinged cap, a thumb nut for securing said pivoted cap in a closed position, the opposite reamer bearing being provided with a screw threaded opening and a bearing engaging lug, one of said wrist pin bearings being substantially in line with one of said reamer, bearings, an upwardly extending lug between the last two bearings, a set screw in said lug to provide a support for the middle portion of the connecting rod when in position on the jig.

Des Moines, Iowa, May 7, 1920.

ORRIN C. ZIMMERMAN.